United States Patent
Lebæk et al.

(10) Patent No.: US 10,935,319 B2
(45) Date of Patent: Mar. 2, 2021

(54) U-SHAPED SEAL AND METHOD FOR USE IN CEMENT PLANTS

(71) Applicant: FLSmidth A/S, Valby (DK)

(72) Inventors: Jesper Lebæk, Hasselager (DK); Morten Drivsholm, Blokhus (DK); Linda Kaare Nørskov, Søborg (DK); Henrik Wassard, Bagsværd (DK); Klaus Hjuler, Fredensborg (DK)

(73) Assignee: FLSmidth A/S

( * ) Notice: Subject to any disclaimer, the term of this patent is extended or adjusted under 35 U.S.C. 154(b) by 316 days.

(21) Appl. No.: 16/067,171

(22) PCT Filed: Jan. 20, 2017

(86) PCT No.: PCT/EP2017/051240
§ 371 (c)(1),
(2) Date: Jun. 29, 2018

(87) PCT Pub. No.: WO2017/125579
PCT Pub. Date: Jul. 27, 2017

(65) Prior Publication Data
US 2019/0024976 A1    Jan. 24, 2019

(30) Foreign Application Priority Data
Jan. 22, 2016   (DK) .............................. PA201670033

(51) Int. Cl.
*F27B 7/20*     (2006.01)
*C04B 7/44*     (2006.01)
(Continued)

(52) U.S. Cl.
CPC .......... *F27B 7/2033* (2013.01); *C04B 7/4446* (2013.01); *C04B 7/47* (2013.01);
(Continued)

(58) Field of Classification Search
CPC .................................................... F27B 7/2033
See application file for complete search history.

(56) References Cited

U.S. PATENT DOCUMENTS 5,682,828 A  * 11/1997 Phalen ................ F23C 10/10
                                                     110/245
8,920,736 B2 * 12/2014 Liu .................... F23C 10/10
                                                     422/139
(Continued)

FOREIGN PATENT DOCUMENTS

EP     2959966 A1   12/2015
FR     2566875 A1    1/1986
(Continued)

OTHER PUBLICATIONS

FR2566875—machine translation (Year: 1986).*
International Search Report and Written Opinion dated Mar. 4, 2017, 13 pages.

*Primary Examiner* — Nathaniel Herzfeld
(74) *Attorney, Agent, or Firm* — Jeffrey A. Sharp

(57) ABSTRACT

A method to thermally convert alternative fuels within a loop seal reactor by utilizing preheated/calcined cement meal as the heat source within which alternative fuels are immersed, subjected to drying, pyrolysis and subsequently charred, and an apparatus utilized to practice such method.

15 Claims, 3 Drawing Sheets

(51) Int. Cl.
*F23B 50/10* (2006.01)
*F23G 5/027* (2006.01)
*F23G 5/24* (2006.01)
*C04B 7/47* (2006.01)
*F27B 7/02* (2006.01)

(52) U.S. Cl.
CPC ............ *F23B 50/10* (2013.01); *F23G 5/0276* (2013.01); *F23G 5/24* (2013.01); *F27B 7/20* (2013.01); *F23G 2201/701* (2013.01); *F23G 2900/50204* (2013.01); *F27B 2007/025* (2013.01)

(56) References Cited

U.S. PATENT DOCUMENTS

| | | | |
|---|---|---|---|
| 2002/0035804 A1* | 3/2002 | Garcia-Secovia | ........ F23G 5/50 |
| | | | 48/197 R |
| 2010/0307390 A1* | 12/2010 | Miller | ........ F23G 5/24 |
| | | | 110/255 |
| 2011/0120560 A1 | 5/2011 | Proll et al. | |
| 2016/0039714 A1* | 2/2016 | Streit | ........ C04B 7/432 |
| | | | 106/761 |

FOREIGN PATENT DOCUMENTS

| | | |
|---|---|---|
| WO | 2005108892 | 11/2005 |
| WO | 2006029679 A1 | 3/2006 |
| WO | 2014166838 A1 | 10/2014 |

\* cited by examiner

US 10,935,319 B2

U-SHAPED SEAL AND METHOD FOR USE IN CEMENT PLANTS

FIELD OF INVENTION

The present invention relates to an apparatus and method for the utilization of so-called "alternative fuels" to provide heat that is utilized in the manufacture of cement clinker where cement raw meal is preheated and calcined in a preheater system with a calciner, burned into clinker in a kiln and cooled in a downstream clinker cooler. More specifically the invention involves the method to thermally convert alternative fuels within a loop seal reactor by utilizing pre-heated/calcined cement meal as the heat source in the reactor within which alternative fuels are immersed, subjected to drying and pyrolysis resulting in a charred material. The thus charred alternative fuels that are a by-product of the pyrolysis and the cement raw meal are directed from the reactor to the pyro system of the cement plant, preferably to the calciner, in which the charred alternative fuels are further combusted to provide fuel for the cement manufacturing process. The combustible product gas from the pyrolysis reactor released from the fuel during the treatment can be introduced anywhere in the calciner or at other locations within the cement manufacturing process, and as an example can be introduced into the kiln riser to create a reduction zone to reduce the kiln NOx. The gas can also be used in the kiln burner, or for any external use of the combustible product gas (a syngas where the main combustibles are H2, CO, CH4 and tars). The invention also relates to the loop seal reactor that is utilized in the method.

BACKGROUND OF THE INVENTION

It is known to utilize alternative fuels to provide thermal energy to a cement manufacturing operation. In one such use, alternative fuels are injected directly into a calciner. However, the time required for drying and subsequent de-volatilisation of such fuels will depend on the water content of the fuel and the size and shape of the fuel particles and the chemical composition of the fuel, all of which vary widely for alternative fuels. Insufficient residence time for the alternative fuels typically results in incomplete combustion of the alternative fuels in the calciner due to the limited particle residence time, and the temperature profile of the calciner is affected. As a result, in most instances the amount of thermal energy that a calciner can derive from alternative fuels is limited. It would be advantageous, therefore, to have a method that maximizes the use of alternative fuels within a calciner, and an apparatus for use in such method.

BRIEF DESCRIPTION OF THE INVENTION

The above and other objects are realized by the present invention in which alternative fuel material (alternatively herein "AF") is initially subjected to pyrolysis within a loop seal reactor. In the preferred embodiment the charred material is directed to the calciner. By using a pyrolysis reactor the fuel will get a long retention time which will lead to a better overall burn-out of the charred material in the calciner.

In the reactor the alternative fuel is covered and thoroughly mixed with preheated or calcined (600° C.-900° C.) cement meal in which it is subjected to pyrolysis.

The loop seal reactor is defined as being "U-shaped" and contains means to deliver short, intense gas pulses to the alternative fuel/preheated cement meal mixture to facilitate movement of the mixture from the reactor entrance to its exit.

DETAILED DESCRIPTION OF THE INVENTION

In view of the increased residence time of the materials within the loop seal reactor it is possible to use a variety of combustible waste materials, some of which previously did not lend themselves to use in a calciner utilized in a cement manufacturing operation due to their properties (for example, high water content). In its broadest sense, the term "combustible waste" includes any solid fuel containing volatiles.

In one preferred embodiment the present invention can advantageously utilize very low quality (<appx. 10 MJ/kg) fuel having a high moisture content (up to appx. 60% moisture), and therefore is ideally suited for burning municipal solid waste. Such alternative fuels as shredded tires, furniture, carpets, wood refuse, garden waste, kitchen and other household waste, paper sludge, paper, biomass, petcoke, anthracite, sewage sludge, liquid waste, bleaching earth, car parts, plastic, plastic bales and hazardous medical waste may be used in the invention. The maximum particle size of the alternative fuel utilized in the present invention will of course be determined by the dimensions of the loop seal reactor.

Figure 1:
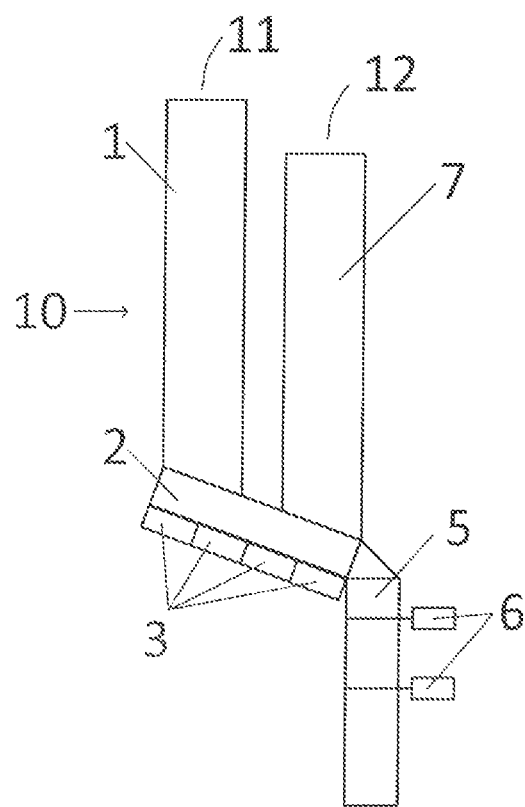
FIG. 1 is a depiction of one embodiment of a loop seal reactor utilized in the present invention.

The reactor is defined as being a "U-seal" tubular structure in the broadest generic sense of the term. Material entering the reactor will embark on a downward path in a first leg until reaching the bottom portion of the reactor, after which it will ascend a second leg until it reaches the material outlet. The first and second legs will be "substantially vertical", by which term it is meant that the legs can be offset from the vertical by as much as 45°, although preferably by no more than 10°. In addition, the legs do not have to be entirely straight, but can be slightly curved. The loop seal may therefore be U-shaped or V-shaped, as just two examples. Moreover, in a U-shaped reactor the bottom leg may be straight or curved, and when straight the bottom portion does not have to be absolutely horizontal as depicted in FIG. 1, as a straight portion that is deployed at a downward angle or slope from the horizontal to facilitate the movement of material by gravity from the first leg to the second leg. The first and second legs do not have to be equal sized, and therefore the loop seal can also be of a J or "reverse J" shape. The reactor can have more than one descending and/or ascending legs, and therefore it can, for example, be ɯ or W shaped. The reactor is essentially tubular, but can have varying horizontal cross sectional shapes such as, for example, circular, oval, square or rectangular. Depending upon the desired throughput more than one reactor can be used in the method of the invention. For example, the reactor can be fabricated in modules containing one or more reactors in parallel.

A feature of the present invention is that heat for pyrolysis in the loop seal reactor is provided by thoroughly combining the alternative fuel with hot (600° C.-900° C.) preheated or calcined cement meal that is extracted from the lower stage cyclone in the preheater or the calciner and directed to the material inlet of the reactor. An amount of hot cement meal sufficient to immerse the AF therein will be utilized. As the AF passes through the reactor it will be, in succeeding stages, dried and then subjected to pyrolysis. After the pyrolysis stage the combustible volatile gases have been released from the AF and the remaining solid part of the AF consists of char and ash, which will be directed into the calciner. The loop seal reactor promotes the pyrolysis of the AF, as it will limit the amount of oxygen present in the reactor, along with maximizing the mixing of the cement meal with the AF.

The hot cement meal behaves as cohesive particles in that the particles interlink and form strong bonds together to impede material flow through the tubular reactor. To counter this, the reactor further has means to insert a small amount of pressurized gas pulses into the interior of the reactor in the vicinity of the bottom point of the reactor. Gas pulses originating from the bottom of the reactor will spread like pressure waves up through the material bed, primarily to break the inter-particle bonds, but also to drive out product gas formed during the heat treatment of the AF and provide optimal contact between the AF and the hot cement meal resulting in optimum heat transfer. The pulsation gas used can be pressurized air, flue gas, steam or any other inert gas. The amount of oxygen introduced into the reactor by the gas pluses will be minimal and will not interfere with the pyrolysis of the AF.

The use of a U, i.e. loop, reactor provides for the ability to maintain the AF for a longer retention time in a gas tight environment, thus permitting a more extensive pyrolysis of the AF, so that there will be a complete burn out of the AF remnants when inserted in the reactor.

Before leaving the bottom stage cyclone the meal will pass through a seal that will form a gas tight barrier hindering product gases and calciner gas from reaching the bottom stage cyclone. In one embodiment the seal will be a U-loop seal.

The present process allows for the greater substitution of low value fuel in the cement making process in place of expensive fossil fuels, thus reducing energy costs to the end user.

FIG. 1 shows one embodiment of a loop seal reactor 10 of the present invention. The reactor has a material inlet 11 for receiving AF and hot cement meal that is associated with a substantially vertically oriented downward hollow conduit or leg 1 adaptable to having AF and hot cement meal flow downward there through. The bottom, i.e. lowermost end of leg 1 is connected through a lower, substantially horizontally situated hollow conduit or leg 2 to the bottom of a substantially vertically oriented hollow upward conduit or leg 7, through which AF and hot cement meal will flow upwards toward material outlet 12. Therefore, material entering through material inlet 11 will flow down leg 1 to the bottom of leg 1, enter the first end of leg 2 and travel there through to the second, opposite, end of leg 2, from which it will enter the bottom of leg 7, and then travel upwards through leg 7. The bottom of the lower leg is permeable to gas in that beneath the lower leg 2 there is attached along its length a gas permeable gas distributor 3 (which is comprised of, for example, sintered metal plates, porous ceramic material and similarly porous material preferably having a porosity between about 5 microns to about 100 microns and able to withstand the localized operating conditions of the reactor, and an underlying aeration chamber) through which a gas source (not shown) directs pulses of pressurized gas into lower leg 2 and thereafter into one or both of downward leg 1 and upward leg 7. The gas pulses facilitate the movement of the AF and hot cement meal from the material inlet 11 to the material outlet 12 by breaking cohesive inter-particle bonds in the hot cement meal and promoting localized fluidization of the cement meal. The gas pulses introduced are characterized by having a duration ranging from about 10 to about 200 ms, and preferably from about 10 to about 100 ms, an amplitude ranging from about 0.2 to about 5 bar, and preferably from about 0.5 to about 3 bar, and a frequency ranging from about 0.1 to about 10 hz, and preferably from about 0.2 to about 10 hz. The pulses are generated by a fast acting solenoid valve (response time <1 ms) or any other mechanical device capable of generating high frequency pulses that have a steep rising pressure. An additional benefit of introducing the gas pulses into the loop seal of the present invention is that by monitoring the pressure peak in the aeration chambers it was found that the chamber pressure after a pulse can be correlated to the level of raw meal in the loop seal. In a cold test rig it was found that the raw meal level can be predicted with a precision of ±50 mm. This does however require calibration and the pressure difference across the loop seal is also taken into account. Moreover, it has been found that this method can be used as a diagnostic tool that can be used to reveal a malfunctioning aeration chamber.

In an optional embodiment there is a particle extraction outlet 5 located at the bottom of upward leg 7 through which heavy foreign particles (e.g. large stone or metal parts) can be separated from the cement meal/AF mixture through the deployment of one or more gate valves 6. In addition, the gate valves can be used to empty the reactor of AF and cement meal if needed. Bottom outlet 5 may be connected to the kiln inlet or to a separate container.

Figure 2:
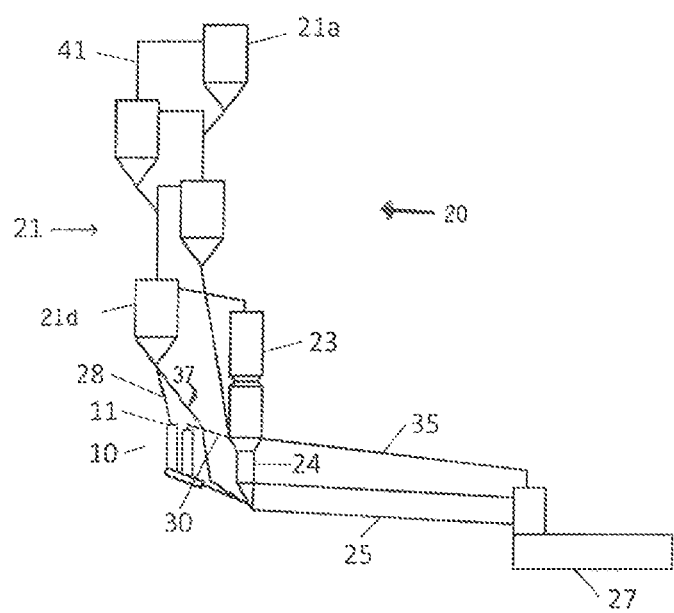
FIG. 2 is a schematic representation illustrating the placement of the loop seal reactor of the present invention within a cement manufacturing process.
Figure 3:
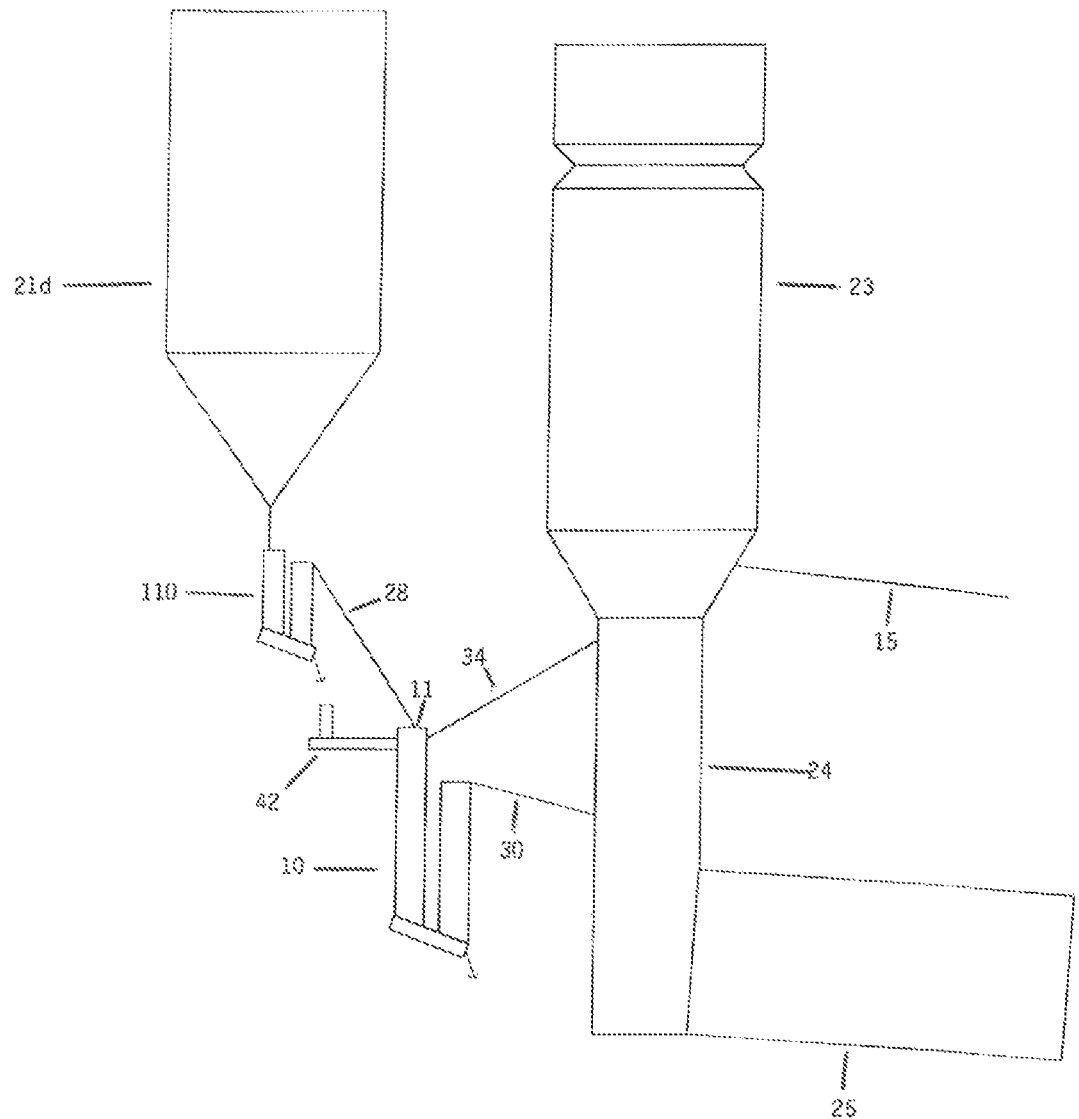
FIG. 3 is a schematic representation illustrating in greater detail the placement of the loop seal reactor of the present invention within the pyro area of a cement manufacturing process.

With reference to FIGS. 2 and 3, there is depicted a plant 20 for manufacturing cement clinker in which loop seal reactor 10 is advantageously utilized. The plant comprises a multi-stage cyclone preheater 21 with calciner 23, a rotary kiln 25, a clinker cooler 27 and a loop seal reactor 10 for pyrolysis of alternative fuel which is introduced into a reactor material inlet 11. In the shown embodiment the loop seal reactor 10 is located adjacent to calciner 23 and kiln riser 24 and is optionally positioned so that hot calcined cement meal will move by gravity from lowermost stage cyclone 21d optionally through a loop seal 110 (FIG. 3) that functions as a gas barrier to the material inlet 11 of loop seal reactor 10 via duct 28. In this particular configuration, loop seal 110 is sized smaller than loop seal 10, since it is only sized to accommodate the cement meal and not the meal/AF mixture, but otherwise will contain the features of loop seal 10 of the present invention, including a source of inserting pressurized gas pulses into the interior of the loop seal and a bottom outlet for oversized cement meal particles, which bottom outlet may in turn be connected to the kiln inlet or to a separate container.

As indicated, some or all of the hot cement meal can be provided in the form of calcined meal. In this regard, using calcined hot cement meal provides the additional synergistic benefit of generating heat within the reactor to further promote the burn off of the alternative fuel, as the pyrolysis of the alternative fuel will promote the recarbonization of the calcined cement meal. Such a reaction, which is highly exothermic, proceeds according to the equation:

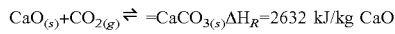

$$CaO_{(s)} + CO_{2(g)} \rightleftharpoons =CaCO_{3(s)} \Delta H_R = 2632 \text{ kJ/kg CaO}$$

Therefore, the CO2 released during pyrolysis is absorbed by calcium oxide component of the calcined hot meal and the released heat will accelerate the pyrolysis of the AF and increase the heating value of the product gases.

Alternatively, hot cement meal can be diverted from the preheater 21, such as from third stage preheater 21c, into the reactor. The amount of hot cement meal diverted, i.e. calcined meal from the lowermost stage cyclone 21d and/or preheated meal from preheater 21, will depend upon the fuel input. Typically, the weight ratio of the meal to AF will range from about 0.5 to about 10 (dry basis). The balance of calcined meal not diverted from the lowermost stage cyclone 21d, which in fact will be the majority of calcined meal from lowermost stage cyclone 21d, will be directed to kiln 25 via conduit 37.

During operation the cement raw meal is directed from a raw meal store (not shown) to the raw meal inlet 41 of the uppermost stage preheater cyclone 21a. From that point the raw meal flows towards the rotary kiln 25 through the cyclones of the preheater 21 and the calciner 23 in counter flow to hot exhaust gases from the rotary kiln 25, thereby causing the raw meal to be heated and calcined. Calcined meal is directed from calciner 23 to bottom stage cyclone 21d where the calcined meal is separated from calciner exhaust gas. In the rotary kiln 25 the calcined raw meal is burned into cement clinker which is cooled in the subsequent clinker cooler 27 by means of atmospheric air. Some of the air thus heated is directed from the clinker cooler 27 via a duct 35 to the calciner 23 as so-called tertiary air.

Alternative fuel, which optionally can comprise in whole or part of municipal waste, is introduced via the waste inlet 11 in reactor 10 such as by a feed screw 42 and is immersed in and mixed with hot cement meal. While in downward leg 1 the waste is first dried and then as it travels through reactor 10, it is heated, pyrolized and at least partially charred while it is simultaneously transported in the direction towards the material outlet 12 of reactor 10.

The charred AF and preheated cement raw meal is directed into the pyro system of plant 20, most preferably calciner 23 via duct 30. Process gas is directed into the calciner via duct 34 (FIG. 3). In another, less preferred embodiment, some or all the by-products from the loop seal reactor 10, including some or all of the product gases, can be directed into rotary kiln 25, with the process gases being utilized in the rotary kiln burner. In another embodiment, some or all of the process gas from the reactor 10 is separately introduced into the kiln riser 24 to create a reduction zone to reduce the NOx produced in kiln 25. In a further embodiment, some or all of the process gas can be utilized outside of the cement process, such as in a process to make combustible gases.

In prior art systems in which AF was inserted directly into the calciner, much of the retention time within the calciner was dedicated to the drying and pyrolysis of the material, leaving insufficient retention time to completely combust the char. In the present system the drying and pyrolysis are completed in the loop seal reactor, thus leaving essentially the entire residence time dedicated to consuming the char.

The calciner configuration depicted in FIGS. 2 and 3 is a so-called "in-line calciner" system in which the calciner is positioned relative to the kiln riser so all of the kiln exhaust gases pass through the calciner. The method of the present invention can also be effectively used with other configurations, including "separate line calciner" systems in which the calcining chamber is at least partially offset from the kiln riser so that kiln combustion gases do not pass through the calciner, and where the combustion air for the calciner is drawn through a separate tertiary air duct.

The mixture of AF and hot cement meal is moved through the reactor as a result of the combination of the pushing force of the material as it is inserted into the reactor and the fluidization effects caused by (i) the process gas being released within the reactor and (ii) the insertion of pulsed gas into the reactor in the manner described. In one embodiment the legs of the reactor will be sized so that the pyrolysis will take place primarily or only in the downward leg 1 so that the product gas can be separated from the AF char/meal mixture and thereby exit the reactor through downward leg 1, with leg 7 therefore transporting only the mixture to the calciner 23.

Although the present invention has been described with reference to preferred embodiments, workers skilled in the art will recognize that changes may be made in form and detail without departing from the spirit and scope of the invention.

The invention claimed is:

1. An apparatus for the heat treatment of solid combustible fuel comprising a hollow tubular structure having at least two substantially vertically extending hollow conduits comprising a first conduit adapted to have particulate material pass downward there through and a second conduit adapted to have particulate material pass upward there through, with each of the first and second conduits having a lower end, with each lower end attached to opposite ends of a bottom hollow third conduit that is adapted to have particulate material pass there through from the lower end of the first conduit to lower end of the second conduit, wherein the tubular structure further comprises a means to direct a pulsed gas upward from beneath the third conduit into the interior of at least one of the vertically extending conduits for a duration ranging from about 10 to about 200 ms, with an amplitude ranging from about 0.2 to about 5 bar and a frequency ranging from about 0.1 to about 10 Hz; the pulsed gas being configured to promote localized fluidization of the particulate material.

2. The apparatus of claim 1 wherein the third conduit is a straight conduit that extends at a downward slope from the lower end of the first conduit to the lower end of the second conduit.

3. The apparatus of claim 1 wherein the third conduit further comprises means for segregating heavy objects in a bottom part of the third conduit.

4. The apparatus according to claim 1 wherein the apparatus further comprises a calciner for calcining cement meal that is provided to the hollow tubular structure and for receiving charred combustible waste from the hollow tubular structure.

5. A method for the heat treatment of combustible waste during a process for the manufacture of cement clinker where cement raw meal is preheated and calcined in a preheater with a calciner, burned into clinker in a kiln and cooled in a subsequent clinker cooler, wherein the waste is subjected to heat treatment in a separate compartment having a material inlet and material outlet wherein the waste is inserted into the compartment and immersed in hot cement meal extracted from the cement clinker manufacturing process, and while so immersed the combustible waste is subjected to drying and pyrolysis, and resulting charring while moving, along with the hot cement meal, through the compartment from the material inlet to the material outlet from which the charred waste and the hot cement meal are delivered to the calciner or the kiln.

6. The method according to claim 5 wherein the material inlet and material outlet of the compartment are sealed off from receiving process gas from the cement manufacturing process.

7. The method according to claim 5 wherein at least some of the cement meal has been calcined, and wherein heat is generated within the compartment by subjecting such calcined hot cement meal to exothermic recarbonization as a result of being reacted with carbon dioxide gas released during the pyrolysis of the combustible waste.

8. The method according to claim 5 wherein the combustible waste inserted into the compartment is municipal waste.

9. The method according to claim 5 wherein the gases produced during the waste heat treatment method are further utilized in the cement making process.

10. The method according to claim 5 wherein at least some the gases produced during the waste heat treatment method are combined with kiln exhaust gases to reduce NOx in the cement manufacturing process.

11. The method according to claim 5 wherein at least some the gases produced during the waste heat treatment method are further utilized in the rotary kiln burner.

12. The method according to claim 5 wherein a pulsed gas is inserted into the compartment to facilitate the movement of the combustible waste and the cement meal from the material inlet to the material outlet.

13. The method according to claim 5 wherein at least some of the hot cement meal is extracted from the preheater.

14. The method according to claim 5 wherein the charred waste and the hot cement meal are delivered only to the calciner.

15. The method according to claim 5 wherein the gases produced during the waste heat treatment method are further utilized in a process to make combustible gases.

* * * * *